Jan. 5, 1932.  J. W. SCHAFER  1,840,258
ACCESSORY FOR WHEELED VEHICLES
Filed Feb. 20, 1930  3 Sheets-Sheet 1
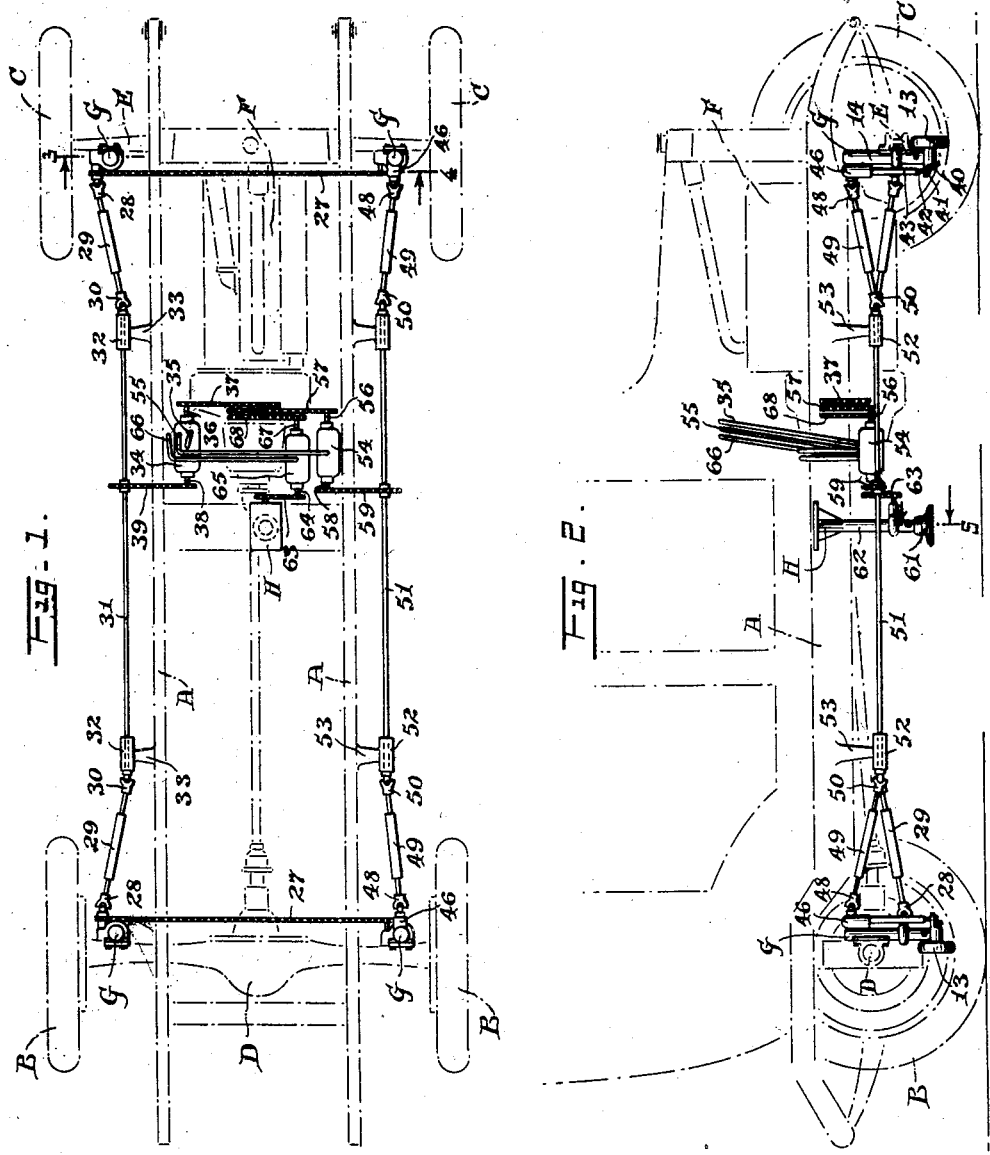
INVENTOR
John W. Schafer
BY
ATTORNEYS Jan. 5, 1932.　　　J. W. SCHAFER　　　1,840,258
ACCESSORY FOR WHEELED VEHICLES
Filed Feb. 20, 1930　　　3 Sheets-Sheet 2
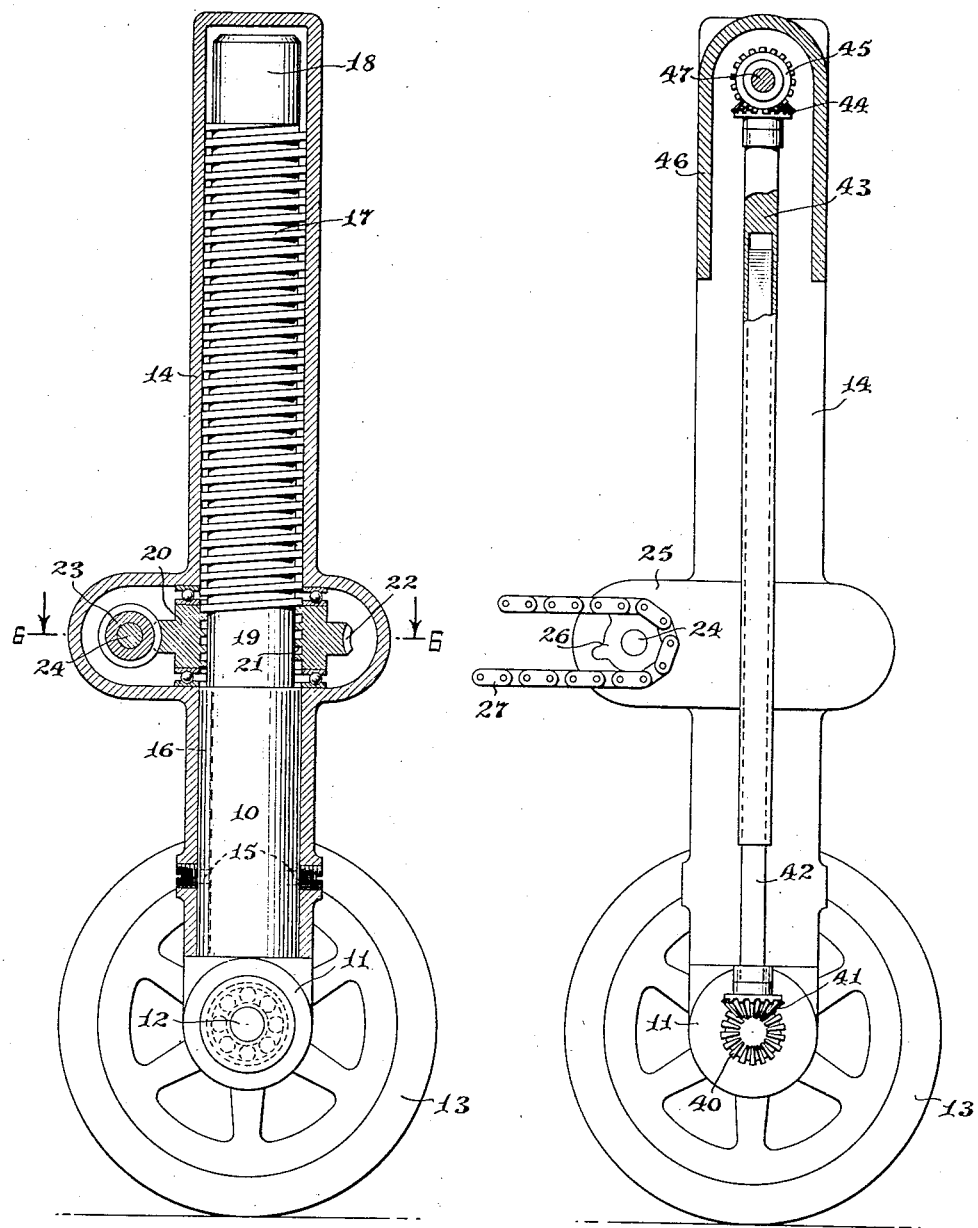
WITNESSES
INVENTOR
John W. Schafer
BY
ATTORNEYS Jan. 5, 1932.  J. W. SCHAFER  1,840,258
ACCESSORY FOR WHEELED VEHICLES
Filed Feb. 20, 1930   3 Sheets-Sheet 3

WITNESSES

INVENTOR
John W. Schafer
BY
ATTORNEYS

Patented Jan. 5, 1932

1,840,258

UNITED STATES PATENT OFFICE

JOHN W. SCHAFER, OF BROOKLYN, NEW YORK

ACCESSORY FOR WHEELED VEHICLES

Application filed February 20, 1930. Serial No. 430,020.

This invention relates to an accessory for wheeled vehicles, and comprehends means permanently carried by the chassis of the vehicle which is operable to lift, support and move the vehicle independent of its supporting wheels.

Broadly, the invention aims to provide means which is permanently carried by the chassis of a vehicle, by virtue of which the vehicle may be jacked up to dispose all of its usual supporting wheels above the ground, floor, road or other supporting surface for various purposes, such as the changing of tires, removal of the wheels, inspecting or effecting repairs to the under side of the vehicle, or for moving the vehicle laterally or at a right angle to its normal path of movement, or for turning the vehicle within the confines of its own length.

More specifically, the invention comprehends means which is permanently carried by the chassis of a wheeled motor vehicle and which preferably forms a permanent accessory therefor which is operable by the motive power of the vehicle, to lift, support and move the vehicle independent of its usual supporting wheels.

The invention further aims to provide means in the nature of an accessory adapted for the purposes set forth which may be controlled by the operator of the vehicle without leaving his seat.

The invention aims as a still further object to provide an accessory of the character set forth, by virtue of which a vehicle may be moved transversely or at a right angle to its normal path of movement, to facilitate the parking of the same in a restricted parking space into and out of which the vehicle could not ordinarily be moved by means of the usual supporting wheels and steering mechanism.

Other objects of the invention reside in the comparative simplicity of construction of the accessory, the economy with which the same may be constructed and installed on the vehicle and the general efficiency derived therefrom.

With the above recited and other objects in view, reference is had to the following description and accompanying drawings, in which there is exhibited one example or embodiment of the invention, while the claim defines the actual scope of the same.

In the drawings:

Figure 1 is a plan view of the accessory illustrating the same in full lines installed on a vehicle, which is illustrated in broken lines.

Figure 2 is a side view thereof illustrating the accessory in its inactive position.

Figure 3 is a vertical sectional view on an enlarged scale taken approximately on the line 3—3 of Figure 1.

Figure 4 is a similar view taken approximately on the line 4—4 of Figure 1.

Figure 5:
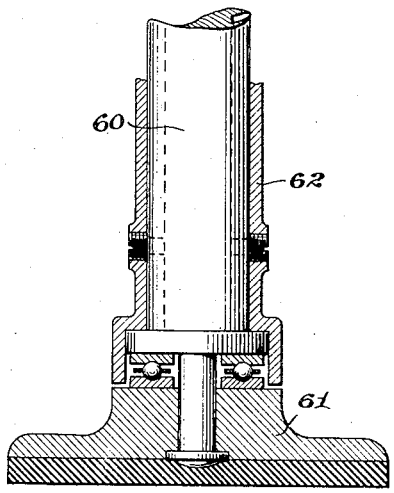
Figure 5 is a fragmentary vertical sectional view on an enlarged scale taken through the intermediate jack.
Figure 6:
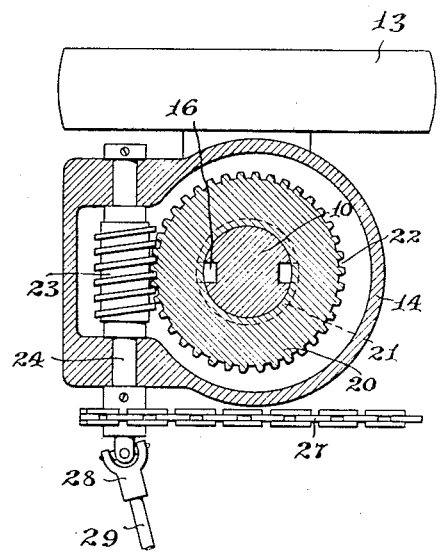
Figure 6 is a horizontal sectional view taken approximately on the line 6—6 of Figure 3.

Referring to the drawings by characters of reference, A designates the side rails of the chassis of an automobile which is supported by the usual rear supporting wheels B and front supporting wheels C which are respectively carried by the rear axle D and the front axle E, it being understood that the vehicle is provided with a motor F for driving the same.

The accessory or attachment constituting the present invention embodies vehicle lifting, supporting and moving devices designated generally by the reference character G installed on the chassis adjacent each of the regular rear and front supporting wheels B and C and an intermediate lifting and supporting means H which is installed on the chassis intermediate the length and width of the vehicle, preferably at a point closer to one end of the vehicle.

The lifting, supporting and moving devices G are of identical construction, and the following description of one of them will apply to all: Each device G essentially consists of a vertically disposed non-rotary shaft 10 provided at its lower end with a suitable bearing 11 in which the axle 12 of a supplemental wheel 13 is journaled. The shaft 10 is guided for vertical movement in a suitable cylindrical casing 14 which is rigidly secured to the chassis in any desired manner, preferably by attachment to the axles D or E. In order to guide the shaft and casing 14 for relative vertical movement while preventing rotation thereof, pins or keys 15 carried by the casing 14 project into peripheral grooves 16 extending longitudinally or axially of the shaft 10. The upper portion of the shaft 10 is formed with a thread 17 which terminates below the reduced unthreaded upper extremity 18 and which terminates above the reduced unthreaded intermediate portion 19 formed at the juncture with the remaining lower portion of the shaft 10. In order to provide means for effecting relative vertical movement between the shaft 10 and casing 14, a swiveled rotary nut 20 is employed which is formed with internal threads 21. The nut is provided with external worm teeth 22 which are engaged by a worm pinion 23 mounted on a shaft 24 which is journaled in the enlarged portion 25 of the casing 14. The worm pinion shaft 24 is provided with an externally disposed sprocket wheel 26. Obviously, when the sprocket wheel 26, the worm pinion shaft 24 and the worm 23 are rotated in one direction, the nut is turned in a direction to effect relative vertical movement between the shaft 10 and casing 14 and, obviously, when said elements are rotated in the opposite direction, relative movement in an opposite direction is effected between the shaft 10 and casing 14. As illustrated, the devices G which are supported adjacent the rear wheels B have a sprocket chain 27 trained around the sprocket wheels 26 thereof, while the devices G which are supported adjacent the front wheels C have a sprocket chain 27 trained around their sprocket wheels 26. The worm pinion shafts 24 of the devices G mounted on the left side of the vehicle are respectively connected by universal joints 28 to shaft sections 29, which shaft sections are in turn connected by universal joints 30 to a longitudinally extending actuating shaft 31 supported in bearings 32 carried by brackets 33 which are suitably supported from the side rails of the chassis A. Rotation is reversibly imparted to the shaft 31 from the motor F through the medium of any suitable manually controlled power transmission. As illustrated, 34 designates a transmission housing having a manually controlled lever 35 for selectively coupling the shaft 31 with the motor F for driving or turning the shaft 31 in opposite directions or for disconnecting the motor from the shaft 31 to render the transmission neutral. As illustrated, the drive shaft 36 of the transmission 34 is turned in a constant direction by means of a sprocket and chain connection 37 with the motor shaft, while the driven shaft 38 of the transmission 34 is connected by a sprocket and chain connection 39 with the shaft 31. From the foregoing, it is thus obvious that with the shafts 10 elevated and disposed in a normally inactive raised position as illustrated in Figure 2, if it is desired to lift the vehicle and support the same independent of the supporting wheels B and C, the operator manipulates the lever 35 to shift the transmission mechanism 34 so that the motor F will be coupled with the shaft 31 to turn the worm pinions in the proper direction to rotate the nuts 20 for feeding the shafts 10 downwardly until the supplemental wheels 13 engage with the ground, road, floor or other supporting surface. Continued rotation of the nut in this direction will cause the casings 14 and the chassis and vehicle, together with the supporting wheels, to be elevated until the internal threads 21 of the nuts disengage from the threaded portion 17 of the shafts 10. Obviously, the vehicle is now elevated and supported independently of its usual supporting wheels B and C so that the wheels may be removed, tires changed or inspection or repairs made to the under side of the vehicle. At the same time, due to the supplemental wheels 13, it is apparent that the vehicle may be moved sideways or at a right angle to its normal path of movement.

In order to provide means for driving the supplemental wheels of the devices G which are located on the right side of the vehicle in opposite directions from the motive power of the vehicle so that the accessory described may be employed for moving a vehicle sideways into or out of a restricted parking space, said supplemental wheel axles are provided with bevel pinions 40 which mesh with bevel gears 41 secured to a vertical shaft 42 having splined connection with a vertical shaft section 43 provided at its upper end with a bevel pinion 44 meshing with a bevel gear 45. The bevel gear 45 is enclosed in a housing 46 carried by the casing 14 and the bevel gear 45 is secured to a shaft 47, which shaft is connected by a universal joint 48 to a shaft section 49 which is in turn connected by a universal joint 50 to an actuating shaft 51 extending longitudinally of and supported in bearings 52 carried by brackets 53 which are suitably supported from the side rail A of the chassis. Rotation is reversibly imparted to the actuating shaft 51 from the motor F through the medium of any suitable manually controlled power transmission. As illustrated, 54 designates the power transmission having a manually controlled lever 55 which extends transversely of the vehicle and is disposed alongside of the lever 35. The lever 55 serves to selectively couple the shaft 51 with the motor F for driving or turning the actuating shaft 51 in opposite directions or for disconnecting the motor from said shaft to render the transmission neutral. As illustrated, the drive shaft 56 of the transmission 54 is connected by a sprocket and chain connection 57 with the motor shaft, while the driven shaft 58 of the transmission 54 is connected by a sprocket and chain connection 59 with the actuating shaft 51. From the foregoing, it is thus apparent that the supplemental wheels 13 at the lower end of the shafts 10 may be selectively driven or turned in opposite directions from the motive power of the vehicle to effect a lateral movement of the vehicle in opposite directions at approximately a right angle to the normal path of movement of the vehicle. This permits the driver of the vehicle to accomplish the parking of the same in a very restricted parking space without the necessity of leaving the driver's seat.

Figure 7:
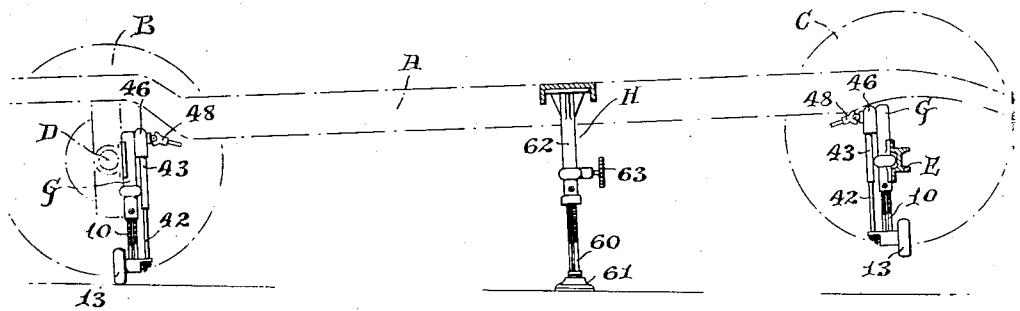
Figure 7 is a diagrammatic view illustrating the manner in which the intermediate jack is employed for turning the vehicle within its own confines and independent of the usual supporting wheels.

The intermediate lifting and supporting means H consists of a vertically disposed non-rotary jack shaft 60 which is provided at its lower end with a swiveled rotary base or foot 61. The jack shaft 60 is suitably mounted and guided for vertical movement in a cylindrical casing 62 which is disposed intermediate the length and width of a vehicle, preferably at a point closer to one end of the vehicle than to the other end and particularly illustrated as closer to the forward end of the vehicle. The jack shaft 60 is practically identical in construction with the shafts 10, but is designed to have a slightly greater movement so as to lift one end of the vehicle a sufficient distance above the ground, floor, road or other supporting surface to dispose the supplemental supporting wheels 13 as well as the main supporting wheels out of engagement with the ground, as illustrated in Figure 7, whereby the vehicle is then supported by the intermediate lifting and supporting means H and the supplemental wheels 13 which remain in contact with the ground. By then connecting the driven supplemental wheels 13 with the motor, it is apparent that the vehicle may be swung around within its own confines or length in the manner of a turntable. The intermediate lifting and supporting means H is connected by a sprocket and chain connection 63 with the shaft 64 of a transmission 65 which is controlled by a lever 66 extending transversely of the vehicle and disposed alongside of the levers 35 and 55. The transmission 65 has its drive shaft 67 connected by a sprocket and chain connection 68 with the motor shaft of the motor F.

From the foregoing, it will thus be seen that means has been provided as an accessory which is permanently carried by the chassis of a motor vehicle, by virtue of which the vehicle may be jacked up by its own motive power to dispose all of its usual supporting wheels above the ground, floor, road or other supporting surface for the varying purposes specified.

What is claimed is:

The combination with a wheeled motor vehicle, of a jack for each wheel supported by the wheel axles respectively adjacent each vehicle wheel, jack actuating means for each jack, a connection between the actuating means of each front jack and between the actuating means of each rear jack, a shaft extending longitudinally at one side of the vehicle and connected respectively to the front and rear jack actuating means at said side of the vehicle, a manually controlled reversible power coupling and transmission interposed between the vehicle motor and said shaft for selectively connecting the shaft to the motor to drive the jacks in reverse directions or for disconnecting the shaft from the motor.

Signed at Brooklyn, in the county of Kings and State of New York, this 18th day of February, A. D. 1930.

JOHN W. SCHAFER.